Patented May 10, 1932

1,857,333

UNITED STATES PATENT OFFICE

LEO ROSENTHAL, OF LEVERKUSEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

NEW SYNTHETIC RESINS

No Drawing. Application filed April 23, 1929, Serial No. 357,600, and in Germany April 30, 1928.

The present invention relates to the manufacture of new synthetic resins from crude solvent naphtha.

I have found, that new technically valuable synthetic resins are obtainable by heating a crude solvent naphtha with or without the addition of phenols or naphthols and with the addition of a boro-fluoro-fatty acid, such as boro-fluoro-acetic, -formic-, -propionic-, oleic acid and the like.

As crude solvent naphtha is used the heavy benzene fraction boiling between 150–195° C., advantageously washed free from bases and often already containing small quantities of phenols. When a fraction washed free from phenols is used resins insoluble in oils are obtained. The use of the fraction containing phenols, the phenol content whereof can be increased, if desired or necessary, by the addition of phenols, cresols, naphthols and the like, yields oil-soluble resins. When the phenol content of the reaction mixture amounts to about 9% or more of the quantity of indene present in the crude solvent naphtha resins soluble in "stand" oil, prepared from lean, stored linseed oil by heating (compare Chemical Abstracts, vol. VI, pp. 3190 and 3192), are produced.

The reaction is advantageously performed by causing small quantities of the boro-fluoro fatty acids (amounts of about 1–5% of the quantity of crude solvent naphtha being mentioned by way of example) to flow very slowly with stirring into the crude solvent naphtha or the mixture thereof with phenols or naphthols. By suitably adjusting the conditions of the reaction, for example by regulating the height of the initial temperature, the rate of stirring, or the addition of the catalyst, by dilution of the reaction mixture with an indifferent solvent such as xylene, toluene, benzene, pure solvent naphtha or the like, or by cooling, care is taken that the reaction temperature does not exceed the boiling point of the reaction mixture. After stirring for about 3–15 hours the reaction is complete in most cases, whereupon the reaction liquid is treated with alkalies or alkaline earth oxides and the volatile constituents are removed in the known manner for instance by steam distillation or distillation in vacuo from the filtered resin solution.

By the use of boro-fluoro fatty acids, especially boro-fluoro acetic acid as catalysts, technically valuable, high-melting resins stable to solutions of alkalies of any concentration and dilute mineral acids are obtained. These resins differ characteristically from the known products obtainable from crude solvent naphtha by means of sulfuric acid or metallic chlorides. While the latter always display a strong yellowish, yellowish-red or yellowish-brown color, which makes itself noticeable in a very undesirable manner in lacquers or artificial masses produced from these resins, the resins obtainable in accordance with the present invention are almost colorless or only very faintly colored and free from the undesirable coloration of the resins above mentioned. Accordingly it is possible by means of the new resins to produce lacquers or artificial masses possessing a lightness of color hitherto unobtainable.

The invention is illustrated by the following examples, without being limited thereto, the parts being by weight:—

*Example 1.*—200 parts of a crude solvent naphtha free from phenols and bases and boiling between 160–182° C. are diluted with 50 parts of xylene. Into the mixture heated to about 18–25° C. 2 parts of boro-fluoro acetic acid are dropped gradually with vigorous stirring. The temperature of the reaction soon rises to 60–65° C. Stirring is continued for about 7 hours, after which the reaction liquid is diluted with 50 parts of purified solvent naphtha and heated to 80–100° C. for ¼ to ½ an hour with 15–20 parts of quick lime or barium oxide while stirring vigorously. It is then filtered from the precipitate and the unresinified portion is distilled off under suitable reduced pressure. A nearly colorless resin is obtained which begins to sinter at 149° C. and melts at 189° C. It is readily soluble in aromatic hydrocarbons and like the products, obtainable in accordance with the following examples, can be worked up with cellulose ethers, if necessary or desired with the addition of softening agents to valuable, plastic masses. When the polymerization of the crude solvent naphtha, above specified, is carried out in the known manner with sulfuric acid a yellowish brown resin is obtained, which melts at 110° C.

*Example 2.*—2 parts of borofluoro acetic acid are run slowly in the course of 2–3 hours with vigorous stirring into 100 parts of crude solvent naphtha heated to 35° C., boiling between about 155–192° C. and containing 58% of cumarone and indene and 4% of phenolic substances, (phenols and cresols), while the temperature of the reaction liquid rises to 60° C. The temperature is prevented by suitable cooling from rising considerably above this level, the stirring is continued for 6–7 hours and heating is then effected to 80–90° C. for half an hour with the addition of 25 parts of xylene or pure solvent naphtha and 6 to 8 parts of barium oxide. The volatile constituents of the filtered, nearly colorless reaction liquid are distilled off in vacuo. There remain 55 parts by weight of an almost colorless resin, which sinters at 140° C. and melts at 165° C. The resin, which is soluble in linseed oil, wood oil, oil of turpentine, tetrahydro-naphthaline and aromatic hydrocarbons, can with advantage be used for the manufacture of oil lacquers.

*Example 3.*—To 600 parts of a crude solvent naphtha, free from phenols and bases, containing 36% of indene and 20% of cumarone and boiling between 164 to 185° C. are added 21 parts of phenol or crude cresol or 33 parts of β-naphthol and the mixture is heated to 30–40° C. when in the course of 3 hours 10 parts of boro-fluoro-acetic acid are introduced with vigorous stirring. The reaction proceeds with a marked rise of temperature. After stirring for 10 hours the reaction mixture is heated for half an hour to 90–100° C. with the addition of 25 parts of quick lime and the but weakly colored reaction liquid is then worked up in the manner described in Example 2.

There are obtained 320 parts of a very light colored resin, soluble in "stand" oil and melting at 147° C. It can be worked up with linseed oil or a mixture of wood oil and stand oil to hard elastic and very light colored lacquers or varnishes, yielding lacquerings of excellent resistance to weather.

*Example 4.*—300 parts of crude solvent naphtha of the boiling point 160–186° C. (free of bases and phenol, containing 44% of indene) are heated to about 50° C. with 11 parts of crude cresol, after which 10 parts of boro-fluoro-oleic acid are caused to run in while stirring. The mixture is heated to about 50–60° C. for 10 hours always while stirring, diluted with 100 parts of benzene and worked up as described in Example 1. A light, stand-oil soluble resin melting at 93° C. is thus obtained.

*Example 5.*—200 parts of a crude solvent naphtha of the boiling point 162–189° C. having been freed from bases and phenols are heated to about 30° C. after which it is stirred for about 6 hours, while slowly adding 5–7 parts of boro-fluoro propionic acid, whereby the temperature raises till to about 55° C. The reaction mixture is then worked up as described in Example 3, a light-colored resin of the melting point of 142° C. being obtained.

*Example 6.*—To 500 parts of the starting material of Example 4, 10–18 parts of boro-fluoro-lactic acid are slowly added at a temperature of 50° C. while stirring, after which the reaction mixture is further stirred for 6–8 hours at a temperature between about 50–60° C. After working up as described in Example 1, a light-colored resin melting at 105° C. is obtained, being soluble in solvent naphtha, oil of turpentine and turpentine substitutes.

I claim:—

1. Process which comprises heating for about 3 to 15 hours a crude solvent naphtha of a boiling point between about 150 to 195° C. with the addition of a boro-fluoro-fatty acid as condensing agent.

2. Process which comprises heating for about 3 to 15 hours a crude solvent naphtha of a boiling point between about 150 to 195° C. containing a phenol with the addition of a boro-fluoro-fatty acid as condensing agent.

3. Process which comprises heating for about 3 to 15 hours and at a temperature not exceeding the boiling point of the reaction mixture a crude solvent naphtha of a boiling point between about 150 to 195° C. with the addition of a boro-fluoro-fatty acid as condensing agent.

4. Process which comprises heating for about 3 to 15 hours and at a temperature not exceeding the boiling point of the reaction mixture a crude solvent naphtha of a boiling point between about 150 to 195° C. containing a phenol with the addition of a boro-fluoro-fatty acid as condensing agent.

5. Process which comprises heating for about 3 to 15 hours and at a temperature not exceeding the boiling point of the reaction mixture a crude solvent naphtha of a boiling point between about 150 to 195° C. with the addition of 1 to 5% of a boro-fluoro-fatty acid as condensing agent.

6. Process which comprises heating for about 3 to 15 hours and at a temperature not exceeding the boiling point of the reaction mixture a crude solvent naphtha of a boiling point between about 150 to 195° C. containing a phenol with the addition of 1 to 5% of a boro-fluoro-fatty acid as condensing agent.

7. Process which comprises heating for about 3 to 15 hours a crude solvent naphtha of a boiling point between 150 to 195° C. with the addition of boro-fluoro-acetic acid as condensing agent.

8. Process which comprises heating for about 3 to 15 hours a crude solvent naphtha of a boiling point between about 150 to 195° C. containing a phenol with the addition of boro-fluoro-acetic acid as condensing agent.

9. Process which comprises heating for about 3 to 15 hours and at a temperature not exceeding the boiling point of the reaction mixture a crude solvent naphtha of a boiling point between about 150 to 195° C. with the addition of boro-fluoro-acetic acid as condensing agent.

10. Process which comprises heating for about 3 to 15 hours and at a temperature not exceeding the boiling point of the reaction mixture a crude solvent naphtha of a boiling point between about 150 to 195° C. containing a phenol with the addition of boro-fluoro-acetic acid.

11. The resins being obtainable according to the process claimed in claim 1, said resins being colorless to weakly colored substances of a melting point between about 90 and 170° C. and stable against solutions of alkalies of any concentration and dilute mineral acids.

12. The resins being obtainable according to the process claimed in claim 2, said resins being colorless to weakly colored substances of a melting point between about 90 and 170° C. and stable against solutions of alkalies of any concentration and dilute mineral acids.

13. The resins being obtainable according to the process claimed in claim 5, said resins being colorless to weakly colored substances of a melting point between about 90 and 170° C. and stable against solutions of alkalies of any concentration and dilute mineral acids.

14. The resins being obtainable according to the process claimed in claim 9, said resins being colorless to weakly colored substances of a melting point between about 90 and 170° C. and stable against solutions of alkalies of any concentration and dilute mineral acids.

15. The resins being obtainable according to the process claimed in claim 10, said resins being colorless to weakly colored substances of a melting point between about 90 and 170° C. and stable against solutions of alkalies of any concentration and dilute mineral acids.

16. The resins being obtainable according to the process claimed in claim 6, said resins being colorless to weakly colored substances of a melting point between about 90 and 170° C. and stable against solutions of alkalies of any concentration and dilute mineral acids.

In testimony whereof I have hereunto set my hand.

LEO ROSENTHAL.